United States Patent
Kim et al.

(10) Patent No.: US 10,321,497 B2
(45) Date of Patent: Jun. 11, 2019

(54) METHOD AND APPARATUS FOR SUPPORTING DATA TRANSMISSION OF NETWORK NODE IN WIRELESS COMMUNICATION SYSTEM

(71) Applicant: LG ELECTRONICS INC., Seoul (KR)

(72) Inventors: Dongsoo Kim, Seoul (KR); Jinsook Ryu, Seoul (KR); Jaehyun Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 15/615,672

(22) Filed: Jun. 6, 2017

(65) Prior Publication Data

US 2018/0103495 A1 Apr. 12, 2018

Related U.S. Application Data

(60) Provisional application No. 62/406,428, filed on Oct. 11, 2016.

(51) Int. Cl.
*H04W 4/00* (2018.01)
*H04W 76/12* (2018.01)
*H04L 12/46* (2006.01)
*H04W 80/04* (2009.01)
*H04W 88/16* (2009.01)

(52) U.S. Cl.
CPC ......... *H04W 76/12* (2018.02); *H04L 12/4633* (2013.01); *H04L 2212/00* (2013.01); *H04W 80/04* (2013.01); *H04W 88/16* (2013.01)

(58) Field of Classification Search
CPC ..... H04L 12/4633; H04L 29/06; H04L 69/22; H04L 2212/00; H04W 76/02; H04W 76/022; H04W 72/04; H04W 76/10; H04W 76/12; H04W 80/04; H04W 88/16
See application file for complete search history.

(56) References Cited

U.S. PATENT DOCUMENTS

2018/0097657 A1* 4/2018 Dao ..................... H04L 12/4633
2018/0097722 A1* 4/2018 Callard ................... H04L 45/38
2018/0220478 A1* 8/2018 Zhu ......................... H04W 4/70

* cited by examiner

*Primary Examiner* — Frank Duong
(74) *Attorney, Agent, or Firm* — Lee Hong Degerman Kang Waimey

(57) ABSTRACT

A method of supporting data transmission of a network node in a wireless communication system includes: receiving downlink data from a Data Network (DN); encapsulating the downlink data with an IP address of an User Equipment (UE) based on whether the DN is an Internet Protocol (IP) based network or a non-IP based network; not encapsulating, if the DN is the IP based network, the received downlink data with the IP address of the UE and encapsulating, if the DN is the non-IP based network, the received downlink data with the IP address of the UE; and transmitting the downlink data encapsulated with the IP address or the downlink data that are not encapsulated with the IP address to an Access Network (AN).

18 Claims, 16 Drawing Sheets

【Fig. 1】
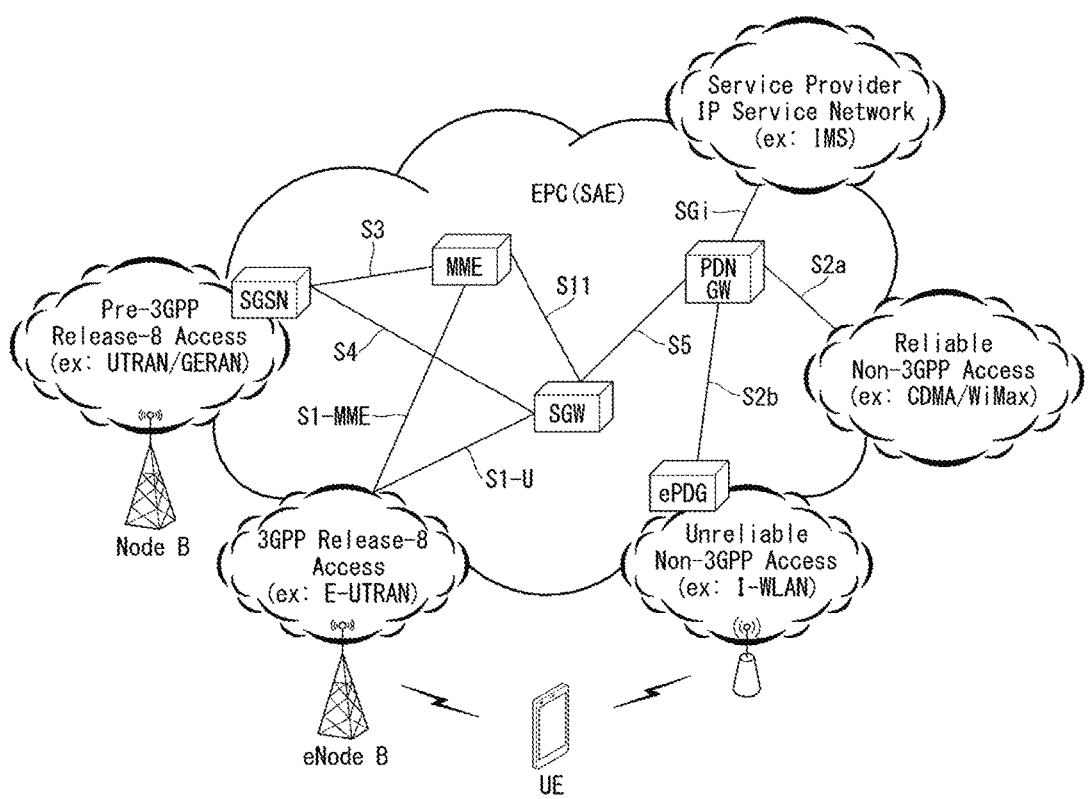

[Fig. 2]
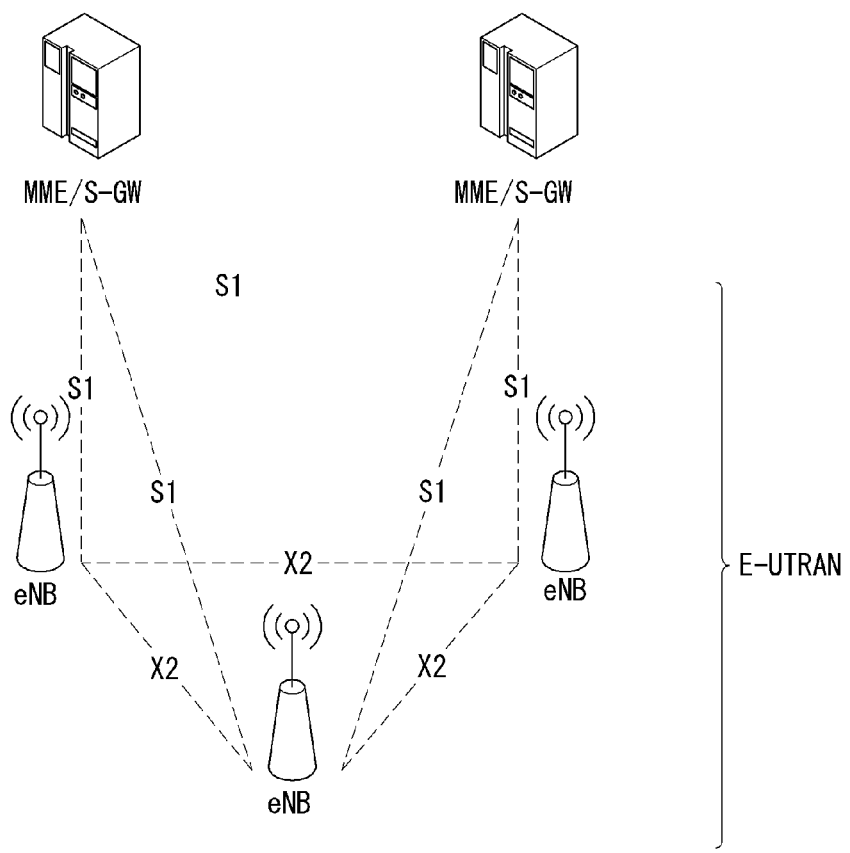

[Fig. 3]
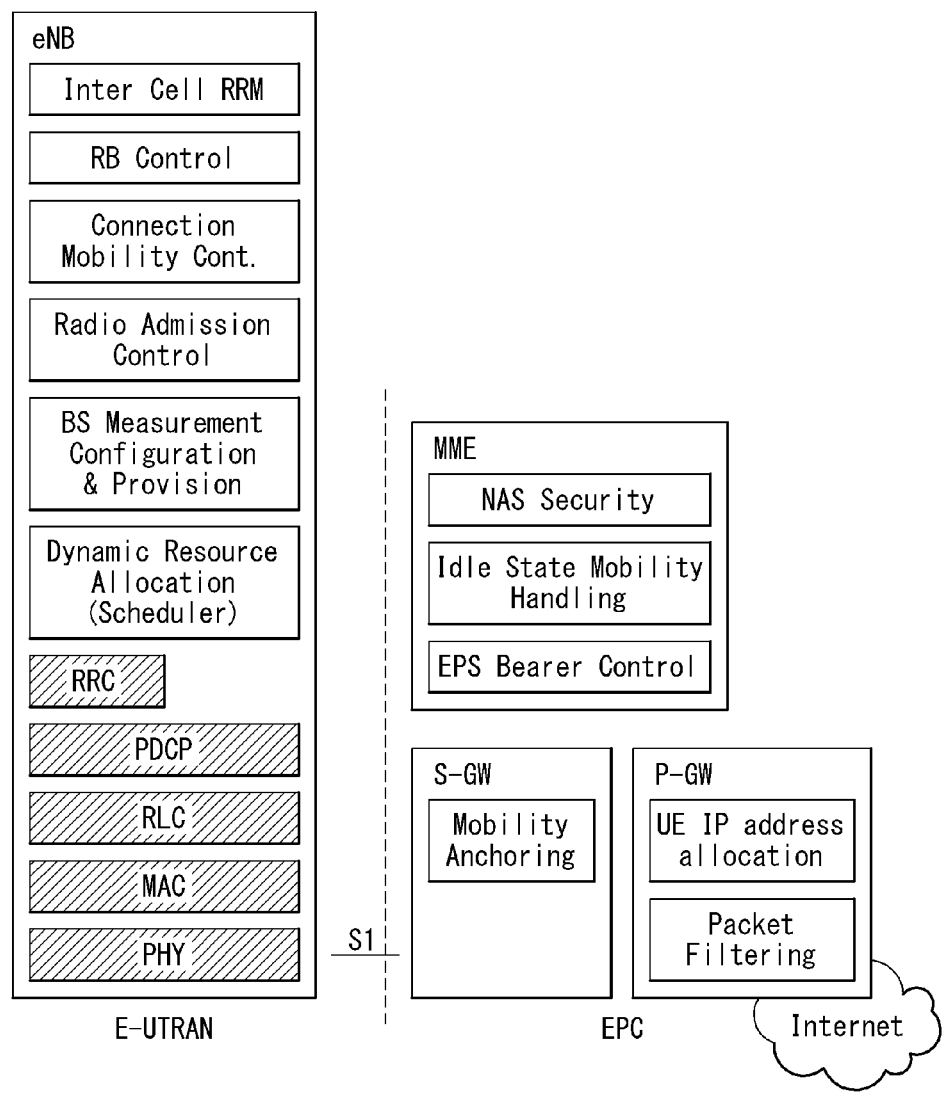

【Fig. 4】
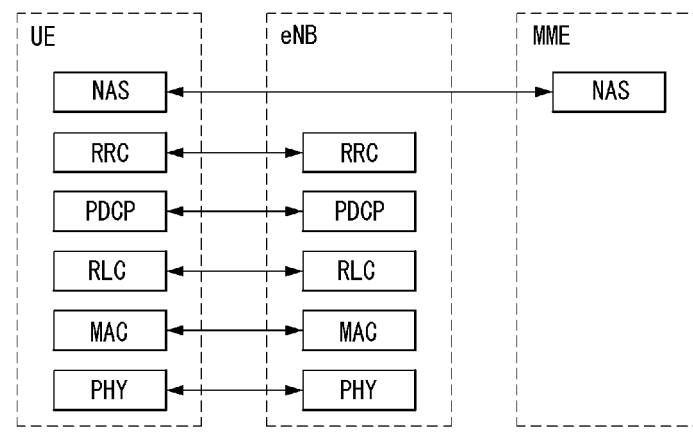
(a) Control Plane Protocol Stack
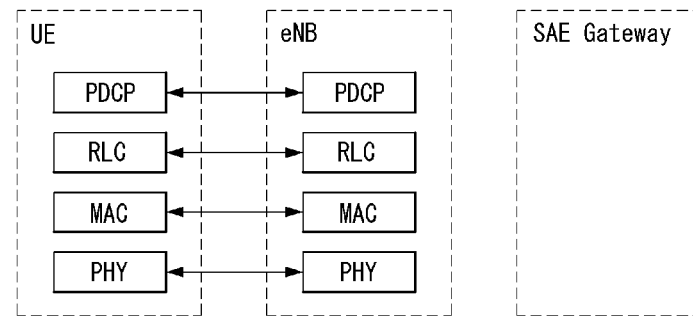
(b) User Plane Protocol Stack 【Fig. 5】
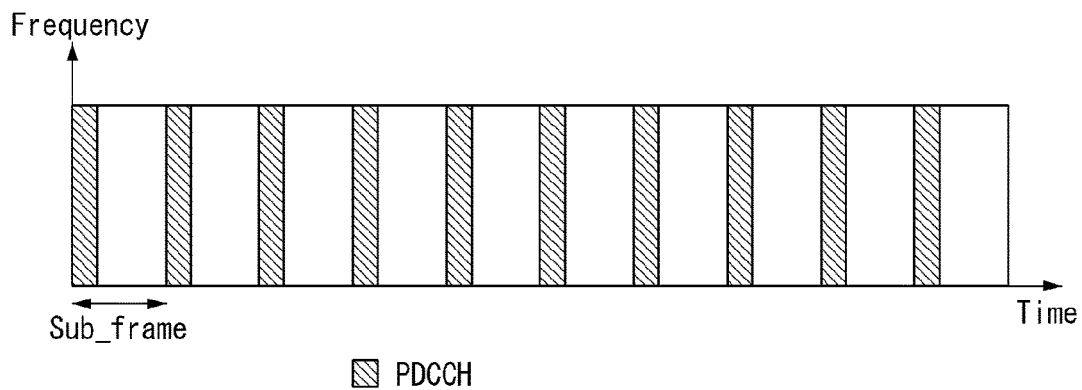
【Fig. 6】
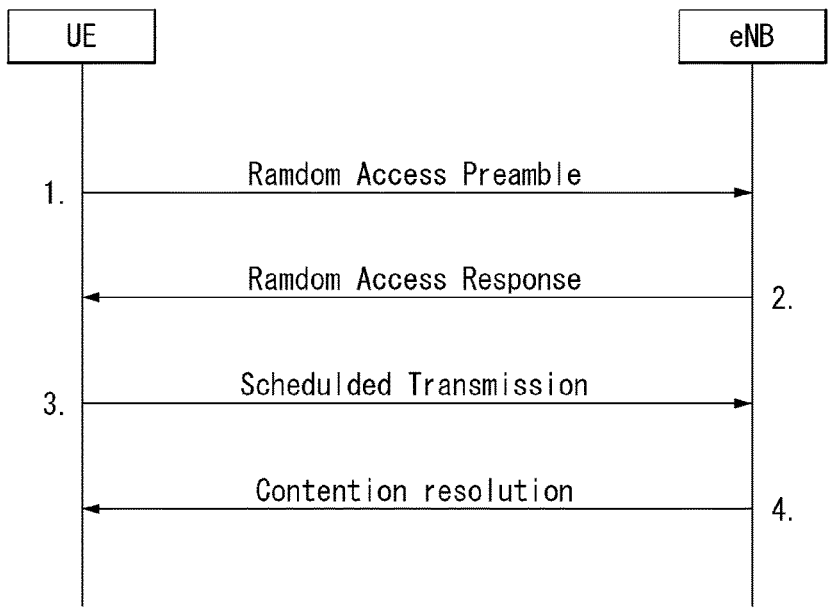

【Fig. 7】
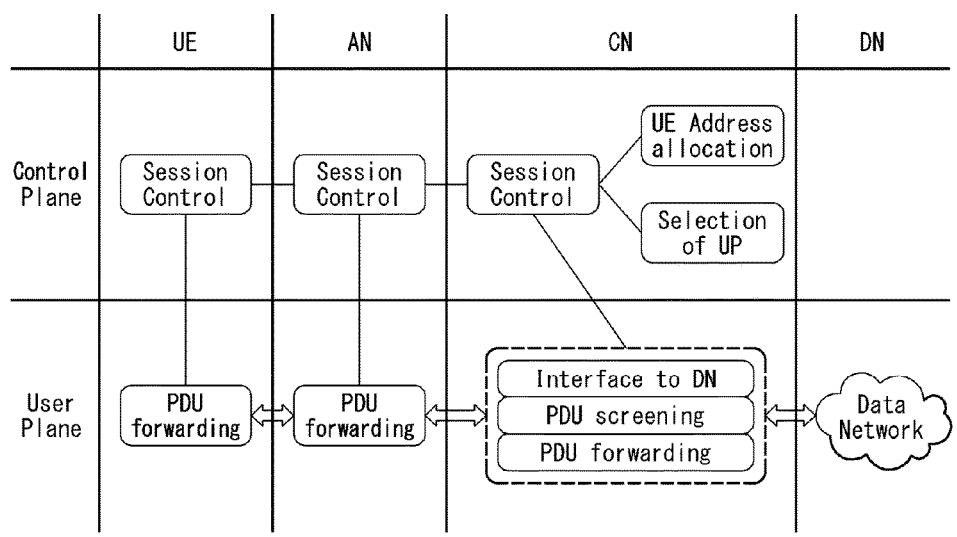
【Fig. 8】
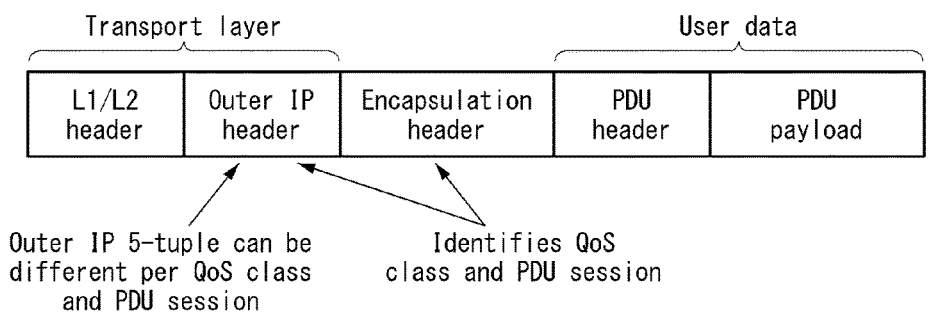

【Fig. 9】
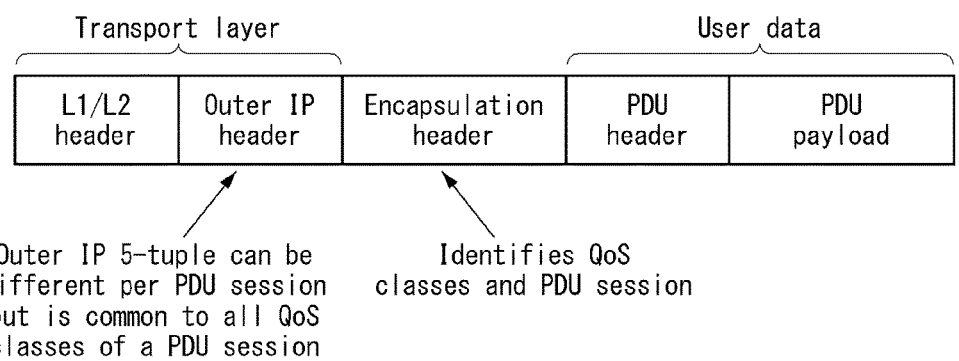
【Fig. 10】
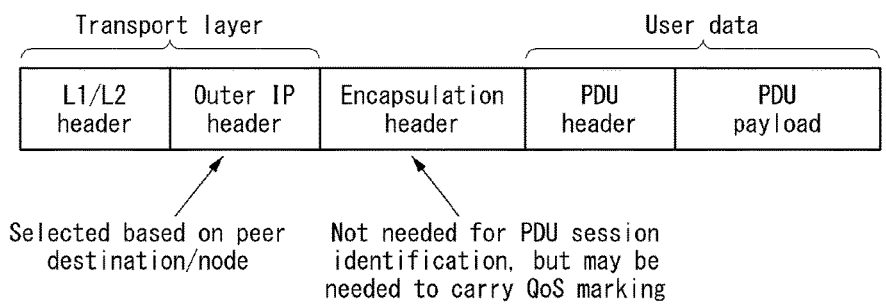

[Fig. 11]
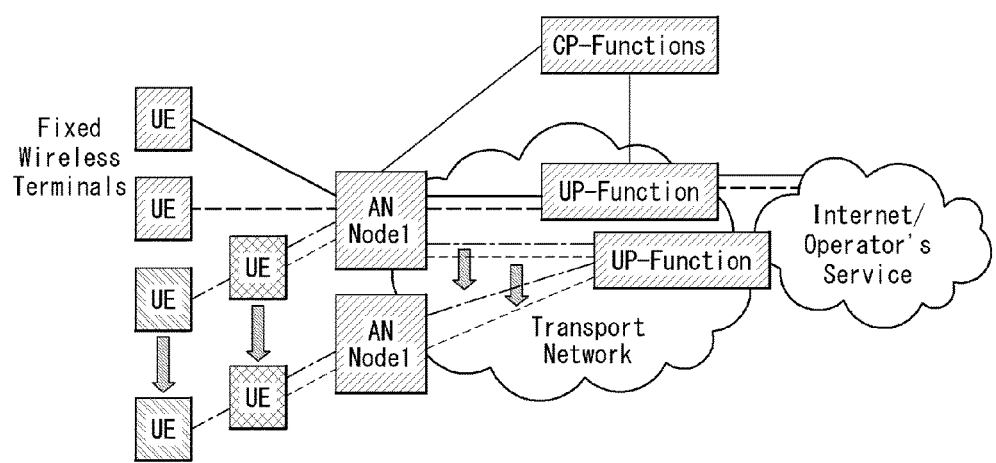

[Fig. 12]
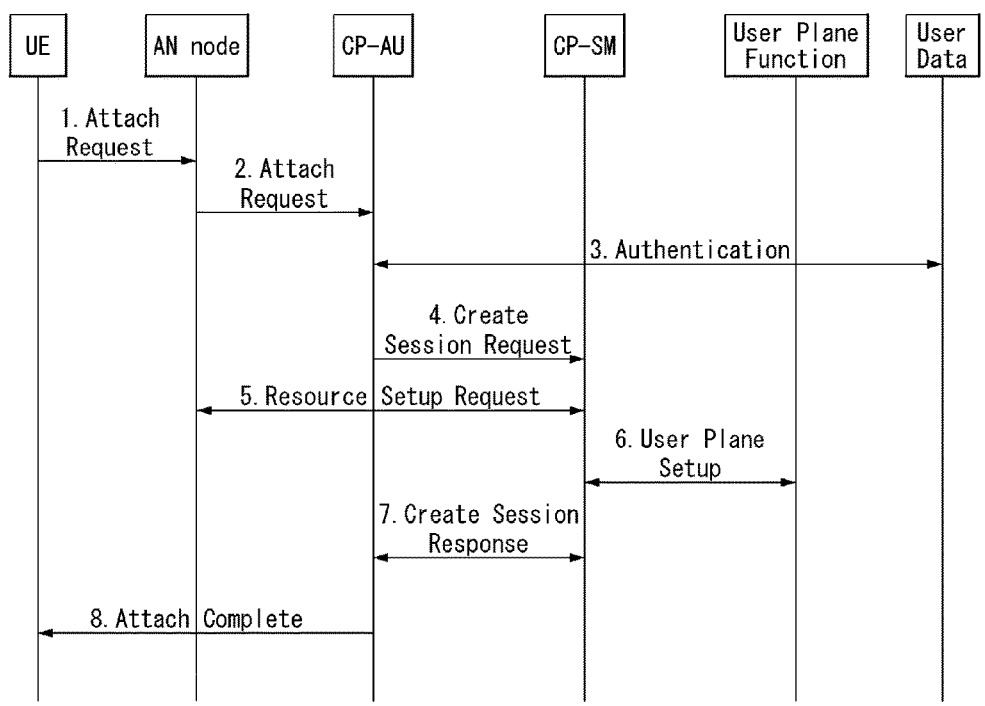

【Fig. 13】
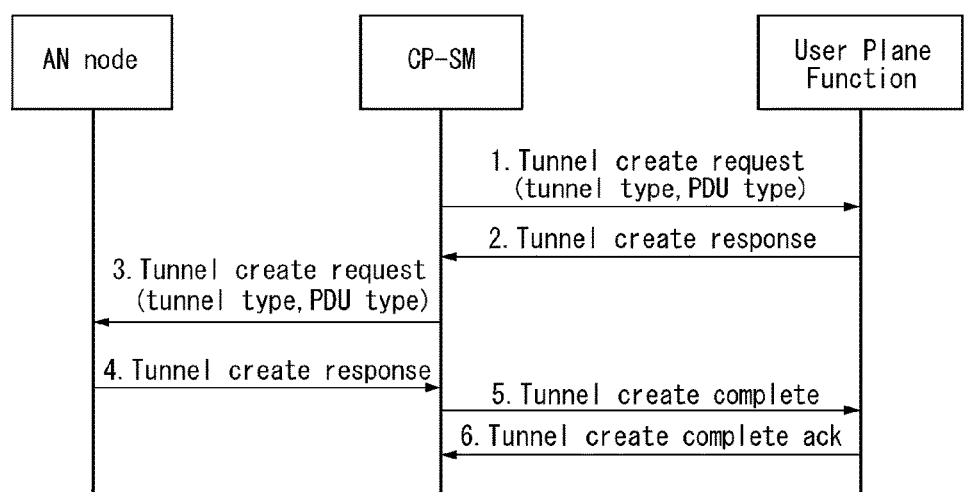

[Fig. 14]
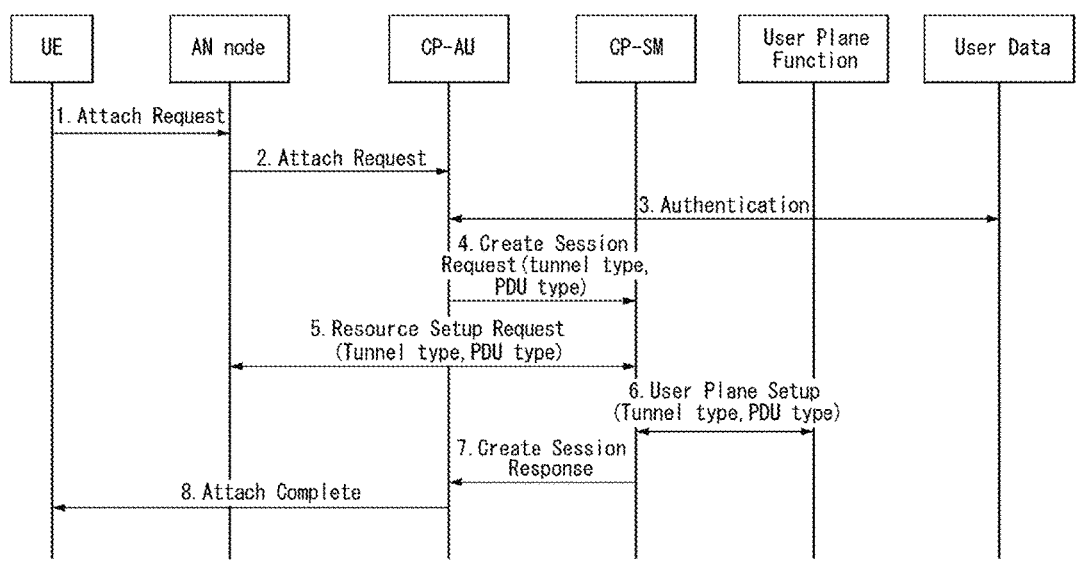

【Fig. 15A】
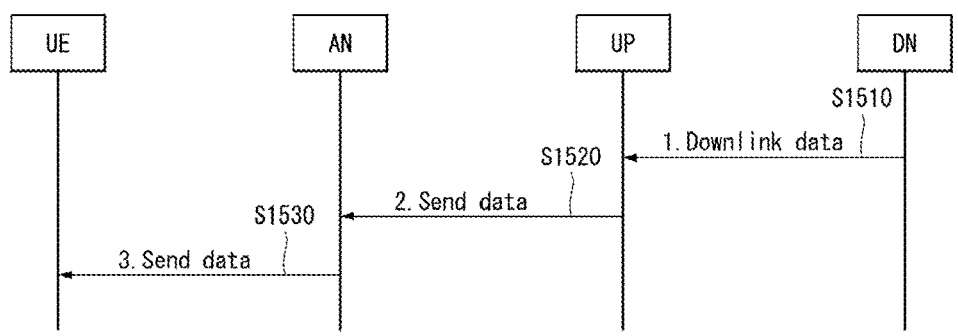

[Fig. 15B]
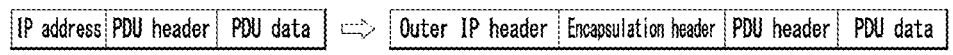
[Fig. 15C]
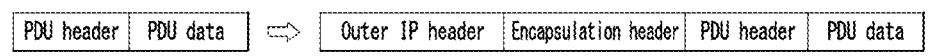
[Fig. 16A]
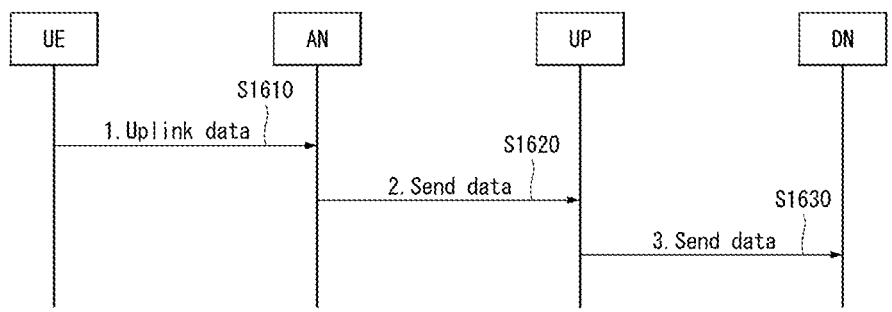

[Fig. 16B]
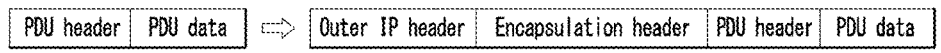
[Fig. 16C]
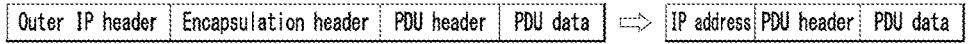
[Fig. 16D]
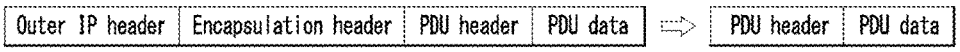

[Fig. 17]
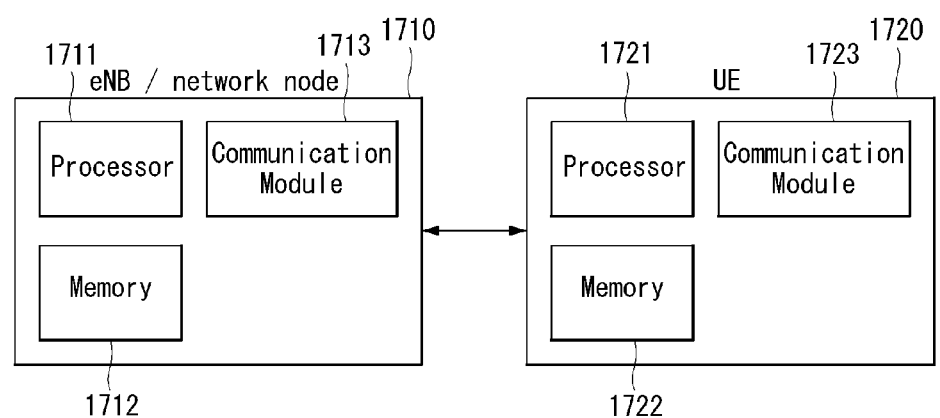

【Fig. 18】
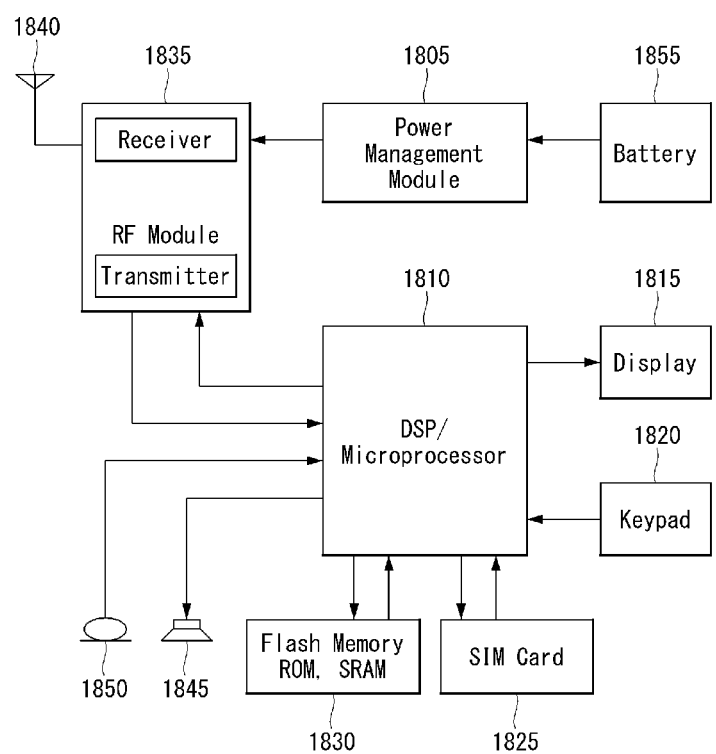

METHOD AND APPARATUS FOR SUPPORTING DATA TRANSMISSION OF NETWORK NODE IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/406,428, filed on Oct. 11, 2016, the contents of which are hereby incorporated by reference herein in its entirety.

BACKGROUND OF THE INVENTION

Field of the Invention

The present invention relates to a wireless communication system, and more particularly, to a method and apparatus for supporting data transmission of a network node in a wireless communication system that supports uplink data/downlink data transmission between a user equipment (UE) and a data network (DN).

Discussion of the Related Art

A mobile communication system has been developed to provide a voice service while guaranteeing user mobility. However, the mobile communication system has been extended to a service range to a data service as well as a voice service, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection devices number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), super wideband support, and device networking have been researched.

SUMMARY OF THE INVENTION

The present invention provides a method of supporting data transmission of a network node in a wireless communication system that supports uplink data/downlink data transmission between a UE and a DN.

The present invention further provides a method of configuring a non-IP packet data unit (PDU) type session (e.g., an Ethernet type PDU session).

The present invention further provides a method of encapsulating an IP address in uplink/downlink data according to a PDU session type (e.g., an IP PDU type or a non-IP PDU type) of a DN for accurate transmission and reception of data that belong to a non-IP PDU type.

The technical problems of the present invention are not limited to the above-described technical problems and the other technical problems will be understood by those skilled in the art from the following description.

In accordance with an aspect of the present invention, a method of supporting data transmission of a network node in a wireless communication system includes: receiving downlink data from a Data Network (DN); encapsulating the downlink data with an IP address of an User Equipment (UE) based on whether the DN is an Internet Protocol (IP) based network or a non-IP based network; not encapsulating, if the DN is the IP based network, the received downlink data with the IP address of the UE and encapsulating, if the DN is the non-IP based network, the received downlink data with the IP address of the UE; and transmitting the downlink data encapsulated with the IP address or the downlink data that are not encapsulated with the IP address to an Access Network (AN).

A PDU session type of the downlink data may be a non-IP PDU type, and a tunneling model generated for the AN may be a per-node level tunnel, and the per-node level tunnel may be a common connection tunnel generated in a node unit for entire traffic between the AN and the network node.

The network node may be a User Plane Function node or a Packet Data Network Gateway (P-GW).

The received downlink data may include the IP address of the UE, if the DN is the IP based network, and the received downlink data may not include the IP address of the UE, if the DN is the non-IP based network.

The IP address of the UE may be an IP address of a target UE to receive the downlink data and be an IP address assigned to the UE by a Control Plane (CP)-Session Management (SM) or a P-GW in a PDU session generation procedure of the UE.

The method may further include encapsulating downlink data encapsulated with the IP address or downlink data that are not encapsulated with the IP address with the IP address of the AN.

The method may further include: receiving uplink data encapsulated with the IP address of the UE from the AN; de-capsulating the encapsulated uplink data based on whether the DN is the IP based network or the non-IP based network; not de-capsulating, if the DN is the IP based network, the encapsulated uplink data and de-capsulating, if the DN is the non-IP based network, the encapsulated uplink data; and transmitting the de-capsulated uplink data or the uplink data that are not de-capsulated to the DN.

A PDU session type of the uplink data may be a non-IP PDU type, and a tunneling model generated for the AN may be a per-node level tunnel, and the per-node level tunnel may be a common connection tunnel generated in a node unit for entire traffic between the AN and the network node.

The network node may be a User Plane Function node or a Packet Data Network Gateway (P-GW).

The encapsulated and received uplink data may be uplink data in which an IP address of the network node is additionally encapsulated and received.

In accordance with another aspect of the present invention, a network node that supports data transmission in a wireless communication system includes: a communication module configured to transmit and receive a signal; and a processor configured to control the communication module, wherein the processor is further configured to receive downlink data from a Data Network (DN), encapsulate the downlink data with an IP address of a User Equipment (UE) based on whether the DN is an Internet Protocol (IP) based network or a non-IP based network, not encapsulate the received downlink data with the IP address of the UE, if the DN is the IP based network and encapsulate the received downlink data with the IP address of the UE, if the DN is the non-IP based network, and transmit the downlink data encapsulated with the IP address or the downlink data that are not encapsulated with the IP address to an Access Network (AN).

A PDU session type of the downlink data may be a non-IP PDU type, and a tunneling model generated for the AN may be a per-node level tunnel, and the per-node level tunnel may be a common connection tunnel generated in a node unit for entire traffic between the AN and the network node.

The network node may be a User Plane Function node or a Packet Data Network Gateway (P-GW).

The received downlink data may include the IP address of the UE, if the DN is the IP based network, and the received downlink data may not include the IP address of the UE, if the DN is the non-IP based network.

The IP address of the UE may be an IP address of a target UE to receive the downlink data and be an IP address assigned to the UE by a Control Plane (CP)-Session Management (SM) or a P-GW in a PDU session generation procedure of the UE.

The processor may additionally encapsulate downlink data encapsulated with the IP address or downlink data that are not encapsulated with the IP address with an IP address of the AN and transmit the downlink data to the AN.

The processor may receive uplink data encapsulated with the IP address of the UE from the AN, de-capsulate the encapsulated uplink data based on whether the DN is the IP based network or the non-IP based network, not de-capsulate the encapsulated uplink data, if the DN is the IP based network, de-capsulate the encapsulated uplink data, if the DN is the non-IP based network, and transmit the de-capsulated uplink data or the uplink data that are not de-capsulated to the DN.

A PDU session type of the uplink data may be a non-IP PDU type, and a tunneling model generated for the AN may be a per-node level tunnel, and the per-node level tunnel may be a common connection tunnel generated in a node unit for entire traffic between the AN and the network node.

The network node may be a User Plane Function node or a Packet Data Network Gateway (P-GW).

The encapsulated and received uplink data may be uplink data in which an IP address of the network node is additionally encapsulated and received.

BRIEF DESCRIPTION OF THE DRAWINGS

For understanding of the present invention, the attached drawings included as a portion of a detailed description provide an exemplary embodiment of the present invention and describe a technical characteristic of the present invention together with a detailed description.

FIG. 1 illustrates an Evolved Packet System (EPS) to which the present invention can be applied.

FIG. 2 illustrates an example of a structure of an evolved universal terrestrial radio access network (E-UTRAN) to which the present invention can be applied.

FIG. 3 illustrates a structure of an E-UTRAN and an EPC in a wireless communication system to which the present invention can be applied.

FIG. 4 illustrates a radio interface protocol structure between a UE and an E-UTRAN in a wireless communication system to which the present invention can be applied.

FIG. 5 illustrates a structure of a physical channel in a wireless communication system to which the present invention can be applied.

FIG. 6 illustrates a contention-based random access procedure in a wireless communication system to which the present invention can be applied.

FIG. 7 illustrates Session management functions in a wireless communication system to which the present invention can be applied.

FIG. 8 illustrates Per QoS class tunnel protocol in a wireless communication system to which the present invention can be applied.

FIG. 9 illustrates Per PDU session tunnel protocol in a wireless communication system to which the present invention can be applied.

FIG. 10 illustrates One tunnel per destination in a wireless communication system to which the present invention can be applied.

FIG. 11 illustrates Scenario with fixed wireless and mobile terminals in a wireless communication system to which the present invention can be applied.

FIG. 12 illustrates a UE attach to the network by an AN node-level tunnel in a wireless communication system to which the present invention can be applied.

FIG. 13 illustrates a network based tunnel establishment procedure according to an exemplary embodiment of the present invention.

FIG. 14 illustrates an UE based tunnel establishment procedure according to an exemplary embodiment of the present invention.

FIG. 15A is a diagram illustrating a method of transmitting downlink data according to an exemplary embodiment of the present invention.

FIGS. 15B and 15C are diagrams illustrating a downlink data/packet.

FIG. 16A is a diagram illustrating a method of transmitting uplink data according to an exemplary embodiment of the present invention.

FIGS. 16B to 16D are diagrams illustrating an uplink data/packet.

FIG. 17 is a block diagram illustrating a configuration of a communication device according to an exemplary embodiment of the present invention.

FIG. 18 is a block diagram illustrating a configuration of a communication device according to an exemplary embodiment of the present invention.

DETAILED DESCRIPTION OF THE EMBODIMENTS

Hereinafter, an exemplary embodiment of the present invention will be described in detail with reference to the attached drawings. A detailed description of the present invention to be described hereinafter together with the attached drawings describes an exemplary embodiment of the present invention and does not represent a sole embodiment in which the present invention may be executed. The following detailed description includes detailed contents in order to provide complete understanding of the present invention. However, a person of ordinary skill in the art knows that the present invention may be executed without such detailed contents.

In several cases, in order to avoid a concept of the present invention from being ambiguous, well-known structures and devices may be omitted or a core function of each structure and device may be mainly shown in a block diagram form.

In this specification, a base station has a meaning as a terminal node of a network that directly communicates with a terminal. In this document, a specific operation described as performed by a base station may be performed by an upper node of the base station in some case. That is, in a network configured with a plurality of network nodes including the base station, it will become apparent that various operations performed for communication with the terminal may be performed by a base station or other network nodes other than the base station. A Base Station (BS) may be replaced with a term such as a fixed station, a Node B, an evolved-NodeB (eNB), a base transceiver system (BTS), and an Access Point (AP). Further, the 'terminal' may be fixed or may have mobility and may be replaced with a term such as a User Equipment (UE), a Mobile Station (MS), a User terminal (UT), a Mobile Subscriber Station (MSS), a Subscriber Station (SS), an Advanced Mobile Station (AMS), a Wireless terminal (WT), a Machine-Type Communication (MTC) device, a Machine-to-Machine (M2M) device, and a Device-to-Device (D2D) device.

Hereinafter, a downlink (DL) means communication from the BS to the terminal, and an uplink (UL) means communication from the terminal to the base station. In the downlink, a transmitter may be a portion of the base station, and the receiver may be a portion of the terminal. In the uplink, the transmitter may be a portion of the terminal, and the receiver may be a portion of the base station.

Specific terms used in the following description are provided for understanding of the present invention, and use of such a specific term may be changed in other forms without deviating from the spirit and scope of the present invention.

The following technology may be used for various wireless access systems such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). The CDMA may be implemented with radio technology such as universal terrestrial radio access (UTRA) or CDMA2000. The TDMA may be implemented with radio technology such as global system for mobile communications (GSM)/general packet radio service (GPRS)/enhanced data rates for GSM evolution (EDGE). The OFDMA may be implemented with radio technology such as IEEE 802.11 (Wi-Fi), IEEE 802.16 (WiMAX), IEEE 802-20, and E-UTRA (evolved UTRA). The UTRA is a portion of a universal mobile telecommunications system (UMTS). 3rd generation partnership project (3GPP) long term evolution (LTE) is a portion of an evolved UMTS (E-UMTS) using E-UTRA and adapts OFDMA in a downlink and adapts SC-FDMA in an uplink. LTE-advanced (A) is innovation of 3GPP LTE.

Exemplary embodiments of the present invention may be supported by standard documents that describe at least one of IEEE 802, 3GPP, and 3GPP2, which are wireless access systems. That is, in exemplary embodiments of the present invention, steps or portions that are not described to clearly expose the spirit and scope of the present invention may be supported by the documents. Further, entire terms of this document may be described by the standard document.

For clear description, 3GPP LTE/LTE-A is mainly described, but a technical characteristic of the present invention is not limited thereto.

Terms that may be used in this document are defined as follows.

Universal Mobile Telecommunications System (UMTS): 3-Generation mobile communication technology based on Global System for Mobile Communication (GSM) and developed by 3GPP.

Evolved Packet System (EPS): A network system configured with an Evolved Packet Core (EPC), which is a packet switched core network based on an Internet Protocol (IP) and an access network such as LTE and UTRAN. The EPS is a network of a form in which the UMTS is innovated.

NodeB: Base station of an UMTS network. The NodeB is installed outdoor and covers a macro cell.

eNodeB: Base station of an EPS network. The eNodeB is installed outdoor and covers a macro cell.

UE: User device. The UE may be referred to as a term such as a terminal, a Mobile Equipment (ME), and a Mobile Station (MS). Further, the UE may be a device that can carry such as a notebook computer, a mobile phone, a Personal Digital Assistant (PDA), a smart phone, and a multimedia device or may be a device that cannot carry such as a Personal Computer (PC) and a vehicle mounting device. In MTC related contents, the UE may indicate an MTC terminal.

IP Multimedia Subsystem (IMS): Subsystem that provides a multimedia service based on IP.

International Mobile Subscriber Identity (IMSI): Internationally uniquely allocated user identifier in a mobile communication network.

Public Land Mobile Network (PLMN): A network configured as an object to provide a mobile communication service to individuals. The PLMN may be divided and configured on an operator basis.

Non-Access Stratum (NAS): A functional layer for transmitting and receiving a traffic message and signaling between a terminal and a core network at UMTS and EPS protocol stacks. The NAS has a main function of supporting mobility of the terminal and supporting a session management procedure that establishes and maintains IP connection between the terminal and a PDN GW.

Hereinafter, the present invention will be described based on the defined terms.

System to which the Present Invention can be Applied

FIG. 1 illustrates an Evolved Packet System (EPS) to which the present invention can be applied.

A network structure diagram of FIG. 1 simply illustrates a structure of an EPS including an Evolved Packet Core (EPC).

An EPC is a core element of System Architecture Evolution (SAE) for enhancing a performance of 3GPP technologies. The SAE corresponds to a research subject that determines a network structure that supports mobility between various kinds of networks. The SAE has a target that provides an optimized packet-based system that supports various wireless access technologies based on, for example, an IP and that provides a more enhanced data transmission ability.

Specifically, the EPC is a core network of an IP mobile communication system for a 3GPP LTE system and may support a packet-based real time and non-real time service. In an existing mobile communication system (i.e., second generation or third generation mobile communication system), a function of a core network was implemented through two distinguished sub-domains of Circuit-Switched (CS) for voice and Packet-Switched (PS) for data. However, in an innovated 3GPP LTE system of the third generation mobile communication system, sub-domains of CS and PS were unified into a single IP domain. That is, in the 3GPP LTE system, connection between terminals having an IP capability may be formed through an IP-based base station (e.g., evolved Node B (eNodeB)), an EPC, an application domain (e.g., IMS). That is, the EPC is an essential structure in implementing an end-to-end IP service.

The EPC may include various constituent elements, and FIG. 1 illustrates a Serving Gateway (SGW) (or S-GW), a Packet Data Network Gateway (PDN GW) (or PGW or P-GW), a Mobility Management Entity (MME), a Serving General Packet Radio Service (GPRS) Supporting Node (SGSN), and an enhanced Packet Data Gateway (ePDG) corresponding to a portion of the various constituent elements.

The SGW operates as a boundary point between a radio access network (RAN) and a core network and is an element that performs a function of maintaining a data path between the eNodeB and the PDN GW. Further, when the terminal moves over an area served by the eNodeB, the SGW performs a function of a local mobility anchor point. That is, for mobility within a Universal Mobile Telecommunications System (Evolved-UMTS) Terrestrial Radio Access Network defined after 3GPP release-8) (E-UTRAN), packets may be routed through the SGW. Further, the SGW may function as an anchor point for mobility with another 3GPP network (RAN defined before 3GPP release-8, for example, UTRAN or Global System for Mobile Communication (GSM)/Enhanced Data rates for Global Evolution (EDGE) Radio Access Network (GERAN)).

The PDN GW corresponds to a termination point of a data interface toward a packet data network. The PDN GW may support policy enforcement features, packet filtering, and charging support. Further, the PDN GW may perform an anchor point function for mobility management with an unreliable network such as a 3GPP network and a non-3GPP network (e.g., an Interworking Wireless Local Area Network (I-WLAN), a Code Division Multiple Access (CDMA) network or a reliable network such as a Wimax).

In an illustration of a network structure of FIG. 1, the SGW and the PDN GW are configured as a separate gateway, but two gateways may be implemented according to a single gateway configuration option.

The MME is an element that performs signaling and control functions for supporting access to network connection of the terminal, allocation of a network resource, tracking, paging, roaming, and handover. The MME controls control plane functions related to a subscriber and session management. The MME manages many eNodeBs and performs signaling for selection of a conventional gateway for handover of another 2G/3G network. Further, the MME performs a function of security procedures, terminal-to-network Session Handling, and idle terminal location management.

The SGSN handles entire packet data such as user mobility management and authentication of another 3GPP network (e.g., GPRS network).

The ePDG functions as a security node of an unreliable non-3GPP network (e.g., I-WLAN, WiFi hotspot).

Referring to FIG. 1, the UE having an IP capability may access to an IP service network (e.g., IMS) in which a provider (i.e., operator) provides via various elements within the EPC based on 3GPP access and non-3GPP access.

Further, FIG. 1 illustrates various reference points (e.g., S1-U, S1-MME). In the 3GPP system, a concept link that connects two functions existing at different functional entities of an E-UTRAN and an EPC is defined to a reference point. Table 1 represents a reference point of FIG. 1. In addition to an illustration of Table 1, various reference points may exist according to a network structure.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference point | Description |
|---|---|
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to the UE mobility and if the Serving GW needs to connect to a non-collocated PDN GW for the required PDN connectivity. |
| S11 | Reference point of the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among reference points of FIG. 1, S2a and S2b correspond to a non-3GPP interface. S2a is a reference point that provides related control and mobility resource between a reliable non-3GPP access and PDN GW to a user plane. S2b is a reference point that provides related control and mobility support between ePDG and PDN GW to a user plane.

FIG. 2 illustrates an example of a network structure of an evolved universal terrestrial radio access network (E-UTRAN) to which the present invention can be applied.

The E-UTRAN system is an innovated system of an existing UTRAN system and may be, for example, a 3GPP LTE/LTE-A system. The communication network is widely disposed to provide various communication services such as a voice (e.g., Voice over Internet Protocol (VoIP)) through IMS and packet data.

Referring to FIG. 2, the E-UMTS network includes an E-UTRAN, an EPC, and at least one UE. The E-UTRAN is configured with eNBs that provide control plane and user plane protocols to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs a function of context transfer between the eNBs, the control of a user plane tunnel between a source eNB and a target eNB, transfer of a handover related message, and uplink load management.

The eNB is connected to the UE through a wireless interface and is connected to an Evolved Packet Core (EPC) through an S1 interface.

An S1 user plane interface (S1-U) is defined between the eNB and a serving gateway (S-GW). An S1 control plane interface (S1-MME) is defined between the eNB and a mobility management entity (MME). The S1 interface performs an Evolved Packet System (EPS) bearer service management function, a non-access stratum (NAS) signaling transport function, network sharing, and a MME load balancing function. The S1 interface supports many-to-many-relation between the eNB and the MME/S-GW.

The MME may perform various functions of NAS signaling security, Access Stratum (AS) security control, Core Network (CN) Inter-CN signaling for supporting mobility between 3GPP access networks, IDLE mode UE reachability (including execution and control of paging retransmission), Tracking Area Identity (TAI) management (for idle and active mode terminal), PDN GW and SGW selection, MME selection for handover in which the MME is changed, SGSN selection for handover to a 2G or 3G 3GPP access network, roaming, authentication, a bearer management function including dedicated bearer establishment, and Public Warning System (PWS) (including an Earthquake and Tsunami Warning System (ETWS) and Commercial Mobile Alert System (CMAS)) message transmission support.

FIG. 3 illustrates a structure of an E-UTRAN and an EPC in a wireless communication system to which the present invention can be applied.

Referring to FIG. 3, the eNB may perform a function of selection of a gateway (e.g., MME), routing to a gateway for radio resource control (RRC) activation, scheduling and transmission of a broadcast channel (BCH), dynamic resource allocation to the UE in an uplink and a downlink, and mobility control connection in an LTE_ACTIVE state. As described above, a gateway within the EPC may perform a function of origination, LTE_IDLE state management, ciphering of a user plane, a System Architecture Evolution (SAE) bearer control, and ciphering and integrity protection of NAS signaling.

FIG. 4 illustrates a radio interface protocol structure between an UE and an E-UTRAN in a wireless communication system to which the present invention can be applied.

FIG. 4A illustrates a wireless protocol structure of a control plane, and FIG. 4B illustrates a wireless protocol structure of a user plane.

Referring to FIG. 4, layers of a wireless interface protocol between the UE and the E-UTRAN may be divided into a first layer L1, a second layer L2, and a third layer L3 based on subordinate 3 layers of an open system interconnection (OSI) standard model widely known in the art of a communication system. The wireless interface protocol between the UE and the E-UTRAN is horizontally formed with a physical layer, a data link layer, and a network layer and is vertically divided into a protocol stack user plane for transmitting data information and a control plane, which is a protocol stack for transferring signaling.

The control plane is a transmitting path of control messages in which the UE and the network use to manage a call. The user plane means a path that transmits data, for example, voice data or Internet packet data generated in an application layer. Hereinafter, each layer of a control plane and a user plane of a wireless protocol will be described.

By using a physical channel, a physical layer (PHY), which is a first layer L1 provides an information transfer service to a superordinate layer. The physical layer is connected to a medium access control (MAC) layer located at a superordinate level through a transport channel, and data are transmitted between the MAC layer and the physical layer through the transport channel. The transport channels are classified according to a method and feature in which data are transmitted through a wireless interface. Data are transmitted between different physical layers and between a physical layer of a transmitting terminal and a physical layer of a receiving terminal through the physical channel. The physical layer is modulated with an orthogonal frequency division multiplexing (OFDM) method and uses a time and a frequency as a radio resource.

There are several physical control channels used in a physical layer. The physical downlink control channel (PDCCH) notifies the UE of resource allocation of a paging channel (PCH) and a downlink shared channel (DL-SCH) and hybrid automatic repeat request (HARQ) information related to an uplink shared channel (UL-SCH). Further, the PDCCH may transmit UL grant that notifies resource allocation of uplink transmission to the UE. A physical control format indicator channel (PDFICH) notifies the UE of the number of OFDM symbols using for PDCCHs and is transmitted to every subframe. A physical HARQ indicator channel (PHICH) transmits a HARQ acknowledge (ACK)/non-acknowledge (NACK) signal in response to uplink transmission. A physical uplink control channel (PUCCH) transmits uplink control information such as HARQ ACK/NACK, a scheduling request, and a channel quality indicator (CQI) of downlink transmission. The physical uplink shared channel (PUSCH) transmits an UL-SCH.

A MAC layer of the second layer L2 provides a service to a radio link control (RLC) layer, which is a superordinate layer through a logical channel. Further, the MAC layer includes a mapping function between the logical channel and the transport channel and a multiplexing/demultiplexing function to a transport block provided to a physical channel on a transport channel of a MAC service data unit (SDU) that belongs to the logical channel.

An RLC layer of the second layer L2 supports reliable data transmission. A function of the RLC layer includes concatenation, segmentation, and reassembly of an RLC SDU. In order to guarantee various quality of services (QoS) in which a radio bearer (RB) requires, the RLC layer provides three operation modes of a transparent mode (TM), an unacknowledged mode (UM), and an acknowledge mode (AM). An AM RLC provides error correction through an automatic repeat request (ARQ). When the MAC layer performs an RLC function, the RLC layer may be included as a function block of an MAC layer.

A packet data convergence protocol (PDCP) layer of the second layer L2 performs a transfer function of user data in a user plane and a header compression and ciphering function. In order to efficiently transmit an Internet protocol (IP) packet such as Internet protocol version 4 (IPv4) or Internet protocol version 6 (IPv6) through a wireless interface having a small bandwidth, a header compression function means a function of reducing an IP packet header size having a relatively large size and that contains unnecessary control information. A function of a PDCP layer in the control plane includes transfer of control plane data and ciphering/integrity protection.

A radio resource control (RRC) layer located at a lowermost portion of a third layer L3 is defined to only a control plane. The RRC layer performs a function of controlling a radio resource between the UE and the network. For this reason, the UE and the network exchange an RRC message through the RRC layer. The RRC layer controls a logical channel, a transport channel, and a physical channel in relation to a configuration, a re-configuration, and release of radio bearers. For data transmission between the UE and the network, the radio bearer means a logical path provided by the second layer L2. A configuration of a radio bearer means prescription of a feature of a wireless protocol layer and a channel in order to provide a specific service and a configuration of each detailed parameter and operation method. The radio bearer may be again divided into two of signaling RB (SRB) and data RB (DRB). The SRB is used as a path that transmits an RRC message at the control plane, and the DRB is used as a path that transmits user data at the user plane.

A non-access stratum (NAS) layer located as a superordinate layer of the RRC layer performs a function of session management and mobility management.

One cell constituting a base station is set to one of bandwidths such as 1.25, 2.5, 5, 10, and 20 Mhz to provide a downlink or uplink transmission service to several UEs. Different cells may be set to provide different bandwidths.

A downlink transport channel that transmits data from the network to the UE includes a broadcast channel (BCH) that transmits system information, a PCH that transmits a paging message, and a DL-SCH that transmits user traffic or a control message. Traffic or a control message of downlink multicast or a broadcasting service may be transmitted through the DL-SCH or through a separate downlink multicast channel (MCH). An uplink transport channel that transmits data from the UE to the network includes a random access channel (RACH) that transmits an initial control message and an uplink shared channel (UL-SCH) that transmits user traffic or a control message.

The logical channel is a superordinate channel of the transport channel and is mapped to the transport channel. The logical channel may be divided into a control channel for transfer of control area information and a traffic channel for transfer of user area information. The control channel includes a broadcast control channel (BCCH), a paging control channel (PCCH), a common control channel (CCCH), a dedicated control channel (DCCH), and a multicast control channel (MCCH). The traffic channel includes a dedicated traffic channel (DTCH) and a multicast traffic channel (MTCH). The PCCH is a downlink channel that transfers paging information and is used when a network does not know a cell to which the UE belongs. The CCCH is used by the UE that does not have RRC connection to the network. The MCCH is a point-to-multipoint downlink channel used for transferring Multimedia Broadcast and Multicast Service (MBMS) control information from the network to the UE. The DCCH is a point-to-point bi-directional channel used by the UE having RRC connection that transfers dedicated control information between the UE and the network. The DTCH is a point-to-point channel used for only one UE in order to transfer user information that can exist at an uplink and a downlink. The MTCH is a point-to-multipoint downlink channel in order to transfer traffic data from the network to the UE.

In uplink connection between the logical channel and the transport channel, the DCCH may be mapped to the UL-SCH, the DTCH may be mapped to the UL-SCH, and the CCCH may be mapped to the UL-SCH. In downlink connection between the logical channel and the transport channel, the BCCH may be mapped to the BCH or the DL-SCH, the PCCH may be mapped to the PCH, the DCCH may be mapped to the DL-SCH, the DTCH may be mapped to the DL-SCH, the MCCH may be mapped to the MCH, and the MTCH may be mapped to the MCH.

FIG. 5 illustrates a structure of a physical channel in a wireless communication system to which the present invention can be applied.

Referring to FIG. 5, the physical channel transfers signaling and data through a radio resource configured with at least one subcarrier in a frequency domain and at least one symbol in a time domain.

One subframe having a length 1.0 ms is configured with a plurality of symbols. Specific symbol(s) (e.g., a first symbol of the subframe) of the subframe may be used for a PDCCH. The PDCCH transmits information (e.g., resource block) about a dynamically allocated resource and a Modulation and Coding Scheme (MCS).

Random Access Procedure

Hereinafter, a random access procedure providing in an LTE/LTE-A system will be described.

Because the UE does not have RRC Connection to the base station, when the UE performs initial access in an RRC idle state, the random access procedure is performed when performing an RRC connection re-establishment procedure.

In the LTE/LTE-A system, in a process of selecting a random access preamble (RACH preamble), the UE provides both a contention based random access procedure that randomly selects and uses one preamble and a non-contention based random access procedure in which a base station allocates to only a specific UE within a specific set.

FIG. 6 illustrates a contention based random access procedure in a wireless communication system to which the present invention can be applied.

(1) Msg 1 (Message 1)

First, the UE randomly selects one random access preamble (RACH preamble) at a set of random access preambles instructed through system information or a handover command and selects and transmits a physical RACH (PRACH) resource that can transmit the random access preamble.

The base station, having received a random access preamble from the UE decodes the preamble and acquires an RA-RNTI. The RA-RNTI related to the PRACH in which the random access preamble is transmitted is determined according to a time-frequency resource of a random access preamble in which a corresponding UE transmits.

(2) Msg 2 (Message 2)

The base station transmits a random access response addressed with the RA-RNTI acquired through a preamble on a message 1 to the UE. The random access response may include an RA preamble index/identifier, UL grant that notifies an uplink wireless resource, a Temporary Cell RNTI (TC-RNTI), and a time alignment command (TAC). The TAC is information that addresses a time synchronization value in which the base station sends to maintain uplink time alignment to the UE. The UE updates uplink transmission timing using the time synchronization value. When the UE updates time synchronization, the UE starts or restarts a time alignment timer. UL grant includes uplink resource allocation and transmit power command (TPC) used for transmission of a scheduling message (a message 3) to be described later. The TPC is used in determination of transmission power for a scheduled PUSCH.

After the UE transmits a random access preamble, the base station attempts reception of a random access response thereof within a random access response window addressed through system information or handover command, detects a masked PDCCH with the RA-RNTI corresponding to the PRACH, and receives a PDSCH addressed by the detected PDCCH. Random access response information may be transmitted in a form of a MAC packet data unit (MAC PDU), and the MAC PDU may be transferred through the PDSCH.

When the UE successfully receives a random access response having the same random access preamble index/identifier as that of a random access preamble transmitted to the base station, the UE stops monitoring of a random access response. However, until a random access response window is terminated, when the UE does not receive a random access response message or when the UE does not receive an effective random access response having the same random access preamble index as that of a random access preamble transmitted to the base station, it is regarded that reception of the random access response is failed and then the UE may retransmit the preamble.

(3) Msg 3 (Message 3)

When the UE receives an effective random access response, the UE processes each information included in the random access response. That is, the UE applies TAC and stores a TC-RNTI. Further, the UE transmits data stored at a buffer of the UE or newly generated data to the base station using UL grant.

In initial access of the UE, an RRC Connection Request generated in the RRC layer and transferred through the CCCH may be included and transmitted in the message 3, and in an RRC connection re-establishment procedure, an RRC Connection Re-establishment Request generated at the RRC layer and transferred through the CCCH may be included and transmitted in the message 3. Further, the message 3 may include a NAS access request message.

The message 3 should include an identifier of the UE. There are two methods of including an identifier of the UE. In a first method, when the UE already has an effective cell identifier (C-RNTI) allocated from a corresponding cell before the random access procedure, the UE transmits a cell identifier thereof through an uplink transmitting signal corresponding to the UL grant. However, when the UE does not have an effective cell identifier (C-RNTI) allocated from a corresponding cell before the random access procedure, the UE transmits a message 3 including a unique identifier (e.g., S-TMSI or random number) thereof. The unique identifier is generally longer than the C-RNTI.

When the UE transmits data corresponding to the UL grant, the UE starts a contention resolution timer.

(4) Msg 4 (Message 4)

When the base station receives the C-RNTI of a corresponding UE through the message 3 from the UE, the base station transmits a message 4 to the UE using the received C-RNTI. However, when the base station receives the unique identifier (i.e., S-TMSI or random number) from the UE through the message 3, the base station transmits the message 4 to the UE using a TC-RNTI allocated to the corresponding UE in a random access response. For example, the message 4 may include RRC Connection Setup.

The UE transmits data including an identifier thereof through UL grant included in the random access response and awaits an instruction of the base station in order to resolute contention. That is, in order to receive a specific message, the UE attempts reception of a PDCCH. There are two methods of receiving the PDCCH. As described above, in the message 3 transmitted to correspond to the UL grant, when an identifier thereof is a C-RNTI, the UE attempts reception of the PDCCH using the C-RNTI, and when the identifier is an unique identifier (i.e., S-TMSI or random number), the UE attempts reception of the PDCCH using a TC-RNTI included in the random access response. Thereafter, in the former case, before the contention resolution timer is terminated, when the UE receives the PDCCH through the C-RNTI thereof, the UE determines that a random access procedure has been normally performed and terminates the random access procedure. In the latter case, before the contention resolution timer is terminated, when the UE receives the PDCCH through the TC-RNTI, the UE determines data in which a PDSCH addressed by the PDCCH transfers. When a unique identifier thereof is included in the data, the UE determines that a random access procedure has been normally performed and terminates the random access procedure. The UE acquires a C-RNTI through the message 4 and the UE and the network transmit and receive a dedicated message using the C-RNTI.

In an operation in a non-contention based random access process, a random access procedure is terminated with only first message transmission and second message transmission unlike a contention-based random access process of FIG. 6. However, before the UE transmits a random access preamble to the base station with the message 1, the UE receives allocation of the random access preamble from the base station, transmits the allocated random access preamble to the base station with the message 1, and receives a random access response from the base station and thus the random access procedure is terminated.

Session Management

The session management is responsible for the setup of the IP or non-IP traffic connectivity for the UE as well as managing the user plane for that connectivity.

Hereinafter, packet data unit (PDU) session registration information and functions related to session management will be described as a solution for session management.

FIG. 7 illustrates Session management functions in a wireless communication system to which the present invention can be applied.

The PDU Connectivity Service is provided by a PDU Session.

Properties of a PDU Session:

The next generation (NextGen) systems will support connectivity towards different types of Data Network (DN) (e.g. Internet, IMS, corporate/private) and they need to be distinguished by some kind of identifier. The DN is identified by a DN name.

Each PDU Session is associated with a PDU Session type that indicates what PDU type(s) are carried by the PDU Session. The PDU Session Type may be of IP Type, Ethernet Type or non-IP Type.

The following functions are included as part of the solution for Session Management:

Packet forwarding;

Packet screening, i.e. the capability to check that the UE is using the exact IP address/prefix that was assigned to the UE;

Session control, i.e. the overall functionality to handle Session Management (SM) signaling and managing PDU Sessions;

Selection of user plane (UP) function.

The Session Management functionality is used to provide PDU Connectivity Service for different PDU types, including Internet Protocol (IP), Ethernet and non-IP PDU types. Certain session management functionality is PDU type specific, such as e.g. IP address allocation for IP-based PDU types. However, to achieve a generic and re-usable NextGen system it is desirable that most functionality is common for all different PDU types. The following assumptions apply for the solution:

The session management procedures (e.g. for establishing new PDU sessions and modifying/terminating established PDU sessions) are common to all PDU types. However, some information carried by the session management signaling may be PDU specific (e.g. IP addresses in case of IP-based PDU types).

The solution does not require PDU-specific user-plane transport between Access Network (AN) and the core network (CN).

For an IP-based Data Networks, also the following functions are part of the solution for Session Management:

UE IP address allocation.

For an IP-based Data Network, the PDU Session can be identified by one or more allocated IP address(es)/prefix(es) and the DN identity.

The allocation of Session Management functions to UE, AN and CN are shown in the FIG. 7. Note that the FIG. 7 does not assume any specific grouping of these functions into logical Network Functions/Network Entities. This is instead assumed to be handled as part of work on the overall architecture.

In 3GPP SA2, Per-PDU session/QoS class/node level tunneling schemes and SDN based approach are proposed as the User Plane (UP) protocol model of Next Generation (NextGen) Session Management.

1) Solution 1: UP Protocol Model—Per QoS Class Tunnel Protocol

In this option there is one tunnel per Quality of Service (QoS) class and Packet Data Unit (PDU) Session between a pair of Network Functions (NFs) (i.e., processing functions in a network), e.g. between a Radio Access Network (RAN) node and a UP function in the Core Network (CN) or between two UP functions in the CN. This option is similar to how it works for EPC where each QoS class (bearer) can have separate outer Internet Protocol (IP) headers and separate encapsulation (GTP-U: GPRS Tunneling Protocol User Plane) headers.

FIG. 8 illustrates Per QoS class tunnel protocol in a wireless communication system to which the present invention can be applied.

This solution has the following additional properties:

The receiving endpoint can use the outer IP header in combination with encapsulation header fields to determine the PDU Session and QoS class of the packet.

New tunnel parameters need to be established for each QoS class.

At mobility, signaling of tunneling info per QoS class (although several QoS tunnels can be handled in the same message)

Overlapping UE IP-version 4 (IPv4) addresses supported

Different PDU types (IP, Ethernet, non-IP) supported

End-user payload "layer" decoupled from the transport layer, allowing different technologies in the transport layer.

2) Solution 2: UP Protocol Model—Per PDU Session Tunnel Protocol

In this option there is one tunnel per PDU Session between a pair of NFs e.g. between a RAN node and a UP function in the CN and between two UP functions in the CN. All QoS classes of a session share the same outer IP header, but the encapsulation header may carry QoS markings.

FIG. 9 illustrates Per PDU session tunnel protocol in a wireless communication system to which the present invention can be applied.

This solution has the following additional properties:

The receiving endpoint uses an identifier in the encapsulation header, possibly in combination with outer IP header, to determine what session the tunneled PDU belongs to.

Common signaling for all QoS classes in mobility

Overlapping UE IPv4 addresses supported

Different PDU types (IP, Ethernet, non-IP) supported

End-user payload "layer" decoupled from the transport layer, allowing different technologies in the transport layer.

3) Solution 3: UP Protocol Model—Per Node-Level Tunnel

In this option there is a common tunnel for all traffic between each pair of NFs e.g. between a RAN node and a UP function in the CN or between two UP functions in the CN.

FIG. 10 illustrates One tunnel per destination in a wireless communication system to which the present invention can be applied.

This solution has the following additional properties:

There is no identification of the PDU Session within the outer IP header or the encapsulation header. Instead the endpoint needs to use information in the end-user PDU to identify the session, e.g. the UE IP address in case of PDU type IP.

In case one Access Node (AN) connects with one UP accessing multiple Data Networks (DNs), there should be per-Node-per-DN tunnels between the AN and the UP function.

For PDU type IP, the PDU session traffic is identified based on UE IP address. This requires that UE IP addresses are unique in one DN to allow unambiguous traffic identification.

For Ethernet type PDU, a unique ID to identify session at UP function and RAN node is required, which is created per PDU type. The ID is located in PDU header like UE IP address for IP type PDU.

The encapsulation header may or may not be needed, e.g. to carry an identifier for QoS purposes.

In case a node/function supports multiple IP addresses there may be a need to signal the tunnel endpoint addresses in order to direct the traffic to the right IP address of the node/function due to e.g. load balancing.

End-user payload "layer" decoupled from the transport layer, allowing different technologies in the transport layer.

For one AN node, there may be multiple tunnels connecting to different User Plane Gateways (GWs). The node-level tunnel applies to UEs that are stationary and hence do not move. Therefore, the operator can ensure via configuration the assignment of non-overlapping IP addresses within one DN to the UEs belonging to the same Node-level tunnel.

FIG. 11 illustrates Scenario with fixed wireless and mobile terminals in a wireless communication system to which the present invention can be applied.

A scenario where this solution may apply is when "a fixed wireless terminal" connects to the network, e.g., an Internet of Things (IoT) UE, or a Customer-Premises Equipment (CPE) UE providing fixed-network comparable bandwidth as the access service for the "last one mile". Such fixed wireless terminals need almost no movement or may also not be allowed (e.g., per-subscription) to move.

The fixed-UE scenarios are characterized by the large number of connections (e.g., IoT case) and the heavy UP traffics (e.g., CPE case). To simplify the tunnel, an "aggregated" node-level tunnel between the NextGen Access node and the UP Functions could be used.

When a UE attaches to the network or sets up a PDU session to one DN, the Control Plane-Authentication function (CP-AU) authorizes the UE type (e.g., a type of fixed wireless UE) and identify whether AN node level tunnel applies. If so, the Control Plane (CP) will determine the corresponding tunnel for the PDU session based on information such as DN name, the tunnel end point information (e.g., UP IP addresses) or the AN node Identifier (ID) provided by the AN.

The UEs using the same AN node-level tunnel should be connected to the same CP Session Management function (CP-SM). The AN node can identify the UE's traffic through the tunnel information (e.g., outer IP header) and the UE's IP address.

FIG. 12 illustrates a UE attach to the network by an AN node-level tunnel in a wireless communication system to which the present invention can be applied.

The "User Data" (e.g. HSS, Subscriber Repository Function etc.) is the data repository of information related to session management and user subscription for authorization, user identities. It may be a standalone network function or may be collocated with some network function.

The "CP-AU" is a function (or network entity) in the core network that performs UE authentication process and interacts with User Data (or Subscriber Repository Function) for retrieving authentication materials.

The "CP-SM" is a function (or network entity) in the core network that is responsible for establishing, maintaining and terminating PDU Sessions on-demand for the UE in the NextGen system architecture.

1) The UE sends Attach Request to the AN node (e.g. base station, eNB, etc.). The UE type is included in the signaling (similar as RRC message) associated with the attach request.

2) The AN node may recognize the UE type and incorporate the node-level tunnel selection assistance information (i.e., tunnel end point IP addresses, AN node ID) together with the Attach Request message send to CP-AU.

3) The CP-AU verifies the PDU type and User subscription data such as UE type to authenticate the UE.

4) The CP-AU sends Create Session Request message to the CP-SM.

5) The CP-SM select the UP function based on the information such as the DN Name, tunnel selection assistance information provided by AN. The CP-SM assigns UE IP address corresponding to the UP function. The CP-SM then request the AN to setup resources for the session.

6) The CP-SM function setup the user plane with the UP function, i.e., notifies the assigned UE IP address, indicate the tunnel used to the AN and the corresponding traffic handling policy for this Session.

7) The CP-SM sends Create Session Response to CP-AU. The message contains the UE IP address.

8) The CP-AU sends Attach complete to the UE.

Management of UP Format in Per-Node Level Tunnel

As described above, according to a description on each characteristic and use case of a UP protocol model, a difference between the above Per PDU session tunnel protocol and per-node level tunnel is as follows.

In the Per PDU session tunnel protocol, a session and a tunnel are mapped with one-to-one between an AN (a network node that performs a function of the foregoing AN, for example, a base station) and an UP Function node (i.e., a network node, for example, a S-GW and a P-GW that perform the foregoing UP Function) and thus the AN and the UP Function node may determine the tunnel through session ID.

However, in the per-node level tunnel, a session and a tunnel are mapped with N:1 due to per-DN and per-PDU-type tunneling between the AN and the UP Function node. That is, the UP Function node and the AN determine a tunnel through a DN and a PDU session type (may be referred to as a 'PDU type'). Therefore, the per-node level tunnel may be usefully used in a region in which a plurality of fixed wireless terminals (e.g., an IoT device) having no mobility or having little mobility are intensively deployed.

The per-node level tunnel is defined for managing sessions of UEs that receive a service from the same DN (i.e., an Access Point Name (APN), a Packet Data Network (PDN)) between the AN and the UP Function node with one tunnel. Here, the APN means a PDN identifier and means a character string for indicating or distinguishing a PDN.

An existing IP PDU type session configured a session using an IP address in which an AN assigns to an UE and transmitted downlink traffic advancing to the UE. However, in non-IP PDU type session (e.g., an Ethernet type PDU session), a method of configuring the session is not yet defined.

For communication of the non-IP type PDU, even if the CP SM (i.e., a network node, for example, an MME that performs the foregoing CP SM function) assigns an IP address, the AN may not know a PDU session type and thus the AN may not know whether downlink traffic advancing to the UE is traffic that belongs to an IP-type PDU session or a non-IP type PDU session.

Further, as Uplink traffic occurs, when the UP function node receives a packet from the AN, it is not yet defined whether to attach an IP address to a corresponding packet according to a PDU session type (e.g., an IP PDU type or a non-IP PDU type) (i.e., whether the DN is an IP based network or a non-IP based network) of the DN. Accordingly, there is a problem that a UL/DL data packet that belongs to a non-IP PDU type may not be accurately transmitted and received.

In order to solve the above-described problems, the present invention provides an efficient method of processing Downlink data/Uplink data traffic in a session in which the AN and the UP function node use a per-node level tunnel.

The AN may determine whether an IP address of a Downlink packet is de-capsulated using a PDU session type of the tunnel from the CP SM and an assigned IP address and determine whether an IP address is encapsulated in the Uplink packet.

The UP Function node may also determine whether an IP address is encapsulated in the Downlink packet according to a PDU session type of the DN and may determine whether an IP address is de-capsulated in an Uplink packet.

First, the per-node level tunnel may be generated with two methods, i.e., 1) network operator based tunnel establishment, 2) UE request based tunnel establishment. This will be described in detail.

1) Network Operator Based Tunnel Establishment

The Network operator based tunnel establishment procedure is a procedure that does not have an UE that requests a specific DN service, but that previously generates a tunnel according to a network operator's policy.

FIG. 13 illustrates a network based tunnel establishment procedure according to an exemplary embodiment of the present invention.

1. The CP-SM transmits a first tunnel create request message to the UP Function node, thereby requesting to generate a tunnel for a specific DN to a User Plane Function.

In this case, the first tunnel create request message may include a DN and tunnel establishment assistance information (e.g., a Tunnel type (or may be referred to as a tunneling model), and a PDU session type (e.g., an IP PDU type or a non-IP PDU type), QoS).

2. The UP Function node generates a tunnel and transmits a first tunnel create response message in response to a first tunnel create request message to the CP-SM.

3. The CP-SM transmits a second tunnel create request message to the AN node(s), thereby requesting to generate a tunnel to the AN node(s).

In this case, the second tunnel create request message may include a DN and tunnel establishment information (Tunnel type/Tunneling model, PDU session type (e.g., an IP PDU type or a non-IP PDU type), QoS).

Here, the PDU session type may be used for determining a work to perform when the AN node(s) receive(s) downlink data traffic using a tunnel made later, and a detailed description related thereto will be described hereinafter in relation to FIG. 15.

4. The AN node(s) generate(s) a tunnel and transmits a second tunnel create response message in response to a second tunnel create request message to the CP-SM.

5. The CP-SM transmits information about the tunnel generated in the AN node(s) through a tunnel create complete message to the UP Function node.

The UP Function node, having received the tunnel create complete message completes generation of a corresponding tunnel using information about the tunnel generated in the AN node(s).

In this case, the tunnel may be generated on per DN and per PDU session type basis. That is, a plurality of tunnels may be generated on a PDU session type basis in one DN (e.g., a tunnel for an IP PDU type and a tunnel for a non-IP PDU type may be each generated in one DN).

6. The UP Function node completes generation of the tunnel and transmits a tunnel create complete acknowledgement (ack) message in response to a tunnel create complete message to the CP-SM.

Thereafter, when the UE wants to be connected to the DN using the non-IP type PDU, the CP-SM may assign an IP address for a corresponding UE to the AN node and the UP function node. The AN and the UP function node may identify an UE using a corresponding IP address. Further, the AN and the UP function node may use the corresponding IP address for Uplink/Downlink data traffic handling.

2) UE Request Based Tunnel Establishment

A UE request based tunnel establishment procedure is a procedure for generating a tunnel when a UE that requests a specific DN service occurs (e.g., when an attach or session creation request procedure is started).

FIG. 14 illustrates an UE based tunnel establishment procedure according to an exemplary embodiment of the present invention.

1. The UE transmits an attach request message to an AN node.

In this case, the attach request message may include an UE type (e.g., a type of fixed wireless UE).

2. The AN node recognizes the UE type and transmits the attach request message to an CP-AU, thereby notifying node-level tunnel selection information (i.e., tunnel end point IP addresses and AN node ID).

3. The CP-AU determines/authenticates a PDU session type and User subscription data through an interaction with User Data.

4. The CP-AU transmits a Create Session Request message to the CP-SM.

In this case, the Create Session Request message may include a Tunnel type/Tunneling model (e.g., a Per QoS class tunnel protocol, a Per PDU session tunnel protocol, a Per Node-level tunnel, and SDN-Based Approach), a PDU session type (e.g., an IP PDU type, an Ethernet PDU type, and a non-IP PDU type), a DN name, tunnel assistance information).

5. The CP-SM performs a Resource Setup Request procedure.

More specifically, the CP-SM may select an UP function node based on information (i.e., DN name, tunnel assistance information, Tunnel type/Tunneling model, and PDU session type) received from the AN node and the CP-AU. The CP-SM may give an UE IP address when a PDU session type is an IP PDU type, give an IP address when a PDU session type is a non-IP PDU type, and transmit the information (PDU session type and given IP address) to the AN node.

6. The CP-SM performs a User Plane Setup procedure (i.e., generates a user plane) with an UP function node.

In this case, the CP-SM may transmit an UE IP address (in an IP PDU type) or an IP address (in a non-IP PDU type) to the UP function node. Therefore, the UP function node may use an IP address for packet exchange with the DN in a non-IP PDU type.

7. The CP-SM transmits a Create Session Response message to the CP-AU in response to the Create Session Request message.

In this case, the Create Session Response message may include an UE IP address (in an IP PDU type) or an IP address (in a non-IP PDU type).

8. The CP-AU transmits an attach complete message in response to the attach request message to the UE.

FIG. 15 is a diagram illustrating a method of transmitting downlink data according to an exemplary embodiment of the present invention. Particularly, a flowchart of FIG. 15A illustrates a network operation when downlink data/packet to be transmitted from the DN to the UE has occurred.

1. The UP function node receives downlink data from the DN (S1510).

2. When a PDU session type of downlink data in which the UP function node receives is a non-IP PDU type and when a tunneling model generated for an AN to transmit downlink data is a Per-node level tunnel, the UP function node may perform anyone of the following two operations 1) and 2) according to a situation (S1520). In the following exemplary embodiments, the UP function node stores information related to the DN at a subscription (when a session is generated, the information is received from the CP-SM) and determines whether the DN is an IP based network or a non-IP based network using stored DN related information).

1) When the DN is an IP based network (or when downlink data/packet transmitted by the DN is IP address based downlink data/packet) or when a PDU session type is a non-IP PDU type, as shown in FIG. 15B, the UP function node may receive downlink data/packet including an IP address field (a field including an IP address in which the SM CP assigns for the UE, a PDU header field, and a PDU data field from an IP based DN. The UP function node may encapsulate the received downlink data/packet with an outer IP header field and an encapsulation header field and transmit the encapsulated downlink data/packet to the AN. Although the IP address field is not separately shown in the encapsulated downlink data/packet of FIG. 15B, it may be regarded that the IP address field is included in an encapsulation header field (i.e., a PDU header field).

In this case, the UP function node may not separately encapsulate received downlink data/packet with an IP address assigned when the UE generates a PDU session. The reason is that the DN is an IP based network and thus an IP address (i.e., an IP address field) of the UE is already inserted and transmitted to a header (i.e., a PDU header field) of downlink data/packet in which the UP function node receives from the DN.

In an outer IP header field of the encapsulated downlink data/packet, an IP address of an AN to transmit the encapsulated downlink data/packet may be included.

2) When the DN is a non-IP based DN (or downlink data/packet in which the DN transmits is a non-IP based DN, i.e., a destination address of the downlink data/packet is not an IP address) and when a PDU session type is a non-IP PDU type, as shown in FIG. 15C, the UP function node may receive downlink data/packet including a PDU header field and a PDU data field from the non-IP based DN. The UP function node may encapsulate the received downlink data/packet with an outer IP header field and an encapsulation header field and transmit the encapsulated downlink data/packet to the AN.

In this case, the encapsulation header field may include an IP address assigned when the UE generates a PDU session, and the outer IP header field may include an IP address of an AN to transmit the encapsulated downlink data/packet. It may be represented that non-IP based downlink data/packet is encapsulated with an IP address assigned to the UE in PDU session and an IP address of the AN. This is because the DN is a non-IP based DN and thus an IP address (i.e., an IP address field) of the UE is separately inserted and is not transmitted to a header of downlink data/packet in which the UP function node receives from the DN.

When the tunneling model is a Per PDU session tunnel protocol, the UP function node may determine the AN through session ID, transmit downlink data/packet, and not perform separate encapsulation of the corresponding data/packet.

3. The AN, having received the encapsulated downlink data/packet from the UP function node may determine an IP address, a PDU session type, a tunneling model of the corresponding data/packet, and a C-RNTI (in an RRC stage, when the UE is attached, ID of a given UE) of the UE. That is, the AN may determine an IP address and mapping information of the C-RNTI based on the encapsulated downlink data/packet to recognize a target UE. When the PDU session type is a non-IP PDU type, the UP function node transmits downlink data/packet in which a corresponding outer IP header field and encapsulation header field are de-capsulated to the target UE (S1530).

That is, in conclusion, according to the present exemplary embodiment, downlink data/packet transmitted from the DN to the UP function node determines whether an IP address is encapsulated according to whether the DN is an IP based DN or a non-IP based DN. More specifically, when a PDU session type of the downlink data/packet is a non-IP PDU type and when the DN is an IP based DN, the downlink data/packet transmitted from the DN to the UP function node may not be separately/additionally encapsulated but may be transmitted with an IP address. Further, when the PDU session type of the downlink data/packet is a non-IP PDU type and when the DN is a non-IP based DN, the downlink data/packet transmitted from the DN to the UP function node may be encapsulated and transmitted with the IP address.

FIG. 16 is a diagram illustrating a method of transmitting uplink data according to an exemplary embodiment of the present invention. Particularly, a flowchart of FIG. 16A illustrates a network operation when uplink data/packet to be transmitted from the UE to the DN has occurred.

1. The UE may transmit uplink data/packet to the AN (S1610). In this case, the transmitted uplink data/packet may include a PDU header field and a PDU data field.

2. The AN may determine the UE, having transmitted the uplink data/packet and a PDU session type and a tunneling model of uplink data/packet transmitted by the corresponding UE. When the tunneling model is a per-node level tunnel and when the PDU session type is a non-IP PDU type, as shown in FIG. 16B, the AN may encapsulate uplink data/packet with the outer IP header field and the encapsulation header field and transmit the encapsulated uplink data/packet to the UP function node (S1620). In this case, the outer IP header field may include an IP address of an UP function node in which the AN is to transmit uplink data/packet, and the encapsulation header field may include an IP address assigned to the UE when a PDU session of the UE is generated.

3. When the UP function node determines an IP address of the encapsulation header field, determines the UE, having transmitted uplink data/packet, and transmits the received uplink data/packet to the DN, the UP function node may perform anyone of the following operations 1) and 2).

1) When the DN is an IP Based DN or when the PDU Session Type is a Non-IP PDU Type The UP function node may de-capsulate the encapsulated uplink data/packet received from the AN at step S1620, encapsulate the uplink data/packet with an IP address (or an IP address encapsulated at step S1620) included in the encapsulation header field, and transmit the uplink data/packet to the DN. Resultantly, as shown in FIG. 16C, the uplink data/packet transmitted to the DN may be transmitted in a form including an IP address field, a PDU header field, and a PDU data field. It may be regarded that uplink data/packet transmitted from the UP function node to the IP based DN is transmitted in a state in which an IP address is not de-capsulated.

2) When the DN is a Non-IP Based DN and when the PDU Session Type is a Non-IP PDU Type The UP function node may de-capsulate encapsulated uplink data/packet received from the AN at step S1620 and transmit the de-capsulated uplink data/packet to the DN. Resultantly, as shown in FIG. 16D, the uplink data/packet transmitted to the DN may be transmitted in a form including a PDU header field and a PDU data field. It may be regarded that the uplink data/packet transmitted from the UP function node to the non-IP based DN is transmitted in a state in which an IP address is de-capsulated.

That is, in conclusion, in the uplink data/packet transmitted from the UP function node to the DN, de-capsulation of an IP address may be determined according to whether the DN is an IP based DN or a non-IP based DN. More specifically, when a PDU session type of the uplink data/packet is a non-IP PDU type and when the DN is an IP based DN, the uplink data/packet transmitted from the UP function node to the DN may be encapsulated and transmitted with an IP address. Further, when the PDU session type of the uplink data/packet is a non-IP PDU type and when the DN is a non-IP based DN, the uplink data/packet transmitted from the UP function node to the DN may not be encapsulated with the IP address but be transmitted.

Device to which the Present Invention can be Applied

FIG. 17 is a block diagram illustrating a configuration of a communication device according to an exemplary embodiment of the present invention.

Referring to FIG. 17, a wireless communication system includes a network node 1710 and a plurality of UEs 1720.

The network node 1710 includes a processor 1711, a memory 1712, and a communication module 1713. The processor 1711 implements a function, a process and/or a method suggested in FIGS. 1 to 16. Layers of a wired/wireless interface protocol may be implemented by the processor 1711. The memory 1712 is connected to the processor 1711 to store various information for driving the processor 1711. The communication module 1713 is connected to the processor 1711 to transmit and/or receive a wired/wireless signal. The network node 1710 may be, for example, a base station, an MME, a HSS, a SGW, a PGW, a SCEF, a SCS/AS, and a Prose Function. Particularly, when the network node 1710 is a base station, the communication module 1713 may include a radio frequency (RF) unit for transmitting/receiving a wireless signal.

The terminal 1720 includes a processor 1721, a memory 1722, and a communication module (or RF unit) 1723. The processor 1721 implements a function, a process and/or a method suggested in FIGS. 1 to 16. Layers of a wireless interface protocol may be implemented by the processor 1721. The memory 1722 is connected to the processor 1721 to store various information for driving the processor 1721. The communication module 1723 is connected to the processor 1721 to transmit and/or receive a wireless signal.

The memories 1712 and 1722 may exist at the inside or the outside of the processors 1711 and 1721 and may be connected to the processors 1711 and 1721, respectively, by well-known various means. Further, the network node 1710 (a case of a base station) and/or the UE 1720 may have a single antenna or multiple antennas.

FIG. 18 is a block diagram illustrating a configuration of a communication device according to an exemplary embodiment of the present invention.

Particularly, FIG. 18 is a block diagram specifically illustrating the UE of FIG. 17.

Referring to FIG. 18, the UE may include a processor (or a digital signal processor (DSP)) 1810, a RF module (or RF unit) 1835, a power management module 1805, an antenna 1840, a battery 1855, a display 1815, a keypad 1820, a memory 1830, a Subscriber Identification Module (SIM) card 1825 (this element may be selected), a speaker 1845, and a microphone 1850. The UE may include a single antenna or multiple antennas.

The processor 1810 implements a function, a process and/or a method suggested in FIGS. 1 to 17. A layer of a wireless interface protocol may be implemented by the processor 1810.

The processor 1810 is connected to the processor 1810 and stores information related to operation of the processor 1810. The memory 1830 may exist at the inside or the outside of the processor 1810 and may be connected to the processor 1810 by well-known various means.

The user inputs, for example, instruction information such as a phone number by pressing (touching) a button of the keypad 1820 or by voice activation using the microphone 1850. The processor 1810 processes to perform an appropriate function such as reception of such instruction information and calling with a phone number. Operational data may be extracted from the SIM card 1825 or the memory 1830. Further, for user recognition and convenience, the processor 1810 may display instruction information or driving information on the display 1815.

The RF module 1835 is connected to the processor 1810 to transmit and/or receive an RF signal. In order to start communication, the processor 1810 transfers, for example, instruction information to the RF module 1835 in order to transmit a wireless signal constituting voice communication data. The RF module 1835 is configured with a receiver and a transmitter in order to receive and transmit a wireless signal. The antenna 1840 performs a function of transmitting and receiving a wireless signal. When receiving a wireless signal, the RF module 1835 may transfer a signal in order to process by the processor 1810 and may convert a signal with a base band. The processed signal may be converted to audible or readable information output through the speaker 1845.

According to an exemplary embodiment of the present invention, a UL/DL data packet that belongs to a non-IP PDU type can be accurately transmitted and received.

Further, according to an exemplary embodiment of the present invention, because it is determined whether a data packet is encapsulated/de-capsulated based on whether a DN is an IP based network, ambiguity of an encapsulation/de-capsulation execution reference is removed, and a problem can be prevented that an IP address of an UE is overlappingly transmitted due to encapsulation of an IP address of a unnecessary UE.

The effect of the present invention is not limited to the above-described effects and the other objects will be understood by those skilled in the art from the following description.

In the foregoing exemplary embodiments, constituent elements and characteristics of the present invention are combined in a predetermined form. Unless phrases explicitly represent, it should be considered that each constituent element or characteristic is selective. Each constituent element or characteristic may be executed in a form that does not combined with other constituent elements or characteristics. Further, by combining some configurations and/or characteristics, an exemplary embodiment of the present invention may be configured. The order of operations described in exemplary embodiments of the present invention may be changed. Some configurations or characteristics of any exemplary embodiment may be included in another exemplary embodiment or may be replaced with a configuration or a characteristic corresponding to another exemplary embodiment. It will become apparent that claims that are not in an explicit cited relation in the claims may configure an exemplary embodiment by combination and may be included in new claim by amendment after filing.

An exemplary embodiment of the present invention may be implemented by various means, for example, hardware, firmware, software, or combinations thereof. When implementing by hardware, an exemplary embodiment of the present invention may be implemented by at least one application specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor.

When implementing by firmware or software, an exemplary embodiment of the present invention may be implemented in a form of a module, procedure, and function that perform the foregoing function or operation. A software code may be stored at a memory to be driven by a processor. The memory may be located at the inside or the outside of the processor and may transmit and receive data to and from the processor by already known various means.

It will become apparent to a person of ordinary skill in the art that the present invention may be embodied in different specific forms without deviating from essential features of the present invention. Therefore, it should be considered that the detailed description is not to limit the present invention but to illustrate it. Thus, it is intended that the present invention cover the modifications and variations of this invention provided they come within the scope of the appended claims and their equivalents.

INDUSTRIAL APPLICABILITY

An exemplary embodiment of the present invention mainly describes an example applied to a 3GPP LTE/LTE-A system, but can be applied to various wireless communication systems other than the 3GPP LTE/LTE-A system.

What is claimed is:

1. A method of supporting data transmission of a network node in a wireless communication system, the method comprising:
receiving downlink data from a Data Network (DN);
not encapsulating the received downlink data with an Internet Protocol (IP) address of a User Equipment (UE) when the DN is an IP based network, and encapsulating the received downlink data with the IP address of the UE when the DN is a non-IP based network;
transmitting the downlink data encapsulated with the IP address or the downlink data that are not encapsulated with the IP address to an Access Network (AN);
receiving uplink data encapsulated with the IP address of the UE from the AN;
not de-capsulating the encapsulated uplink data when the DN is the IP based network, and de-capsulating the encapsulated uplink data when the DN is the non-IP based network; and
transmitting the de-capsulated uplink data or the uplink data that are not de-capsulated to the DN.

2. The method of claim 1,
wherein a PDU session type of the downlink data is a non-IP PDU type, and a tunneling model generated for the AN is a per-node level tunnel, and
wherein the per-node level tunnel is a common connection tunnel generated in a node unit for entire traffic between the AN and the network node.

3. The method of claim 2, wherein the network node is a User Plane Function node or a Packet Data Network Gateway (P-GW).

4. The method of claim 1,
wherein the received downlink data comprise the IP address of the UE, when the DN is the IP based network, and
wherein the received downlink data do not comprise the IP address of the UE, when the DN is the non-IP based network.

5. The method of claim 1, wherein the IP address of the UE is an IP address of a target UE to receive the downlink data and is an IP address assigned to the UE by a Control Plane (CP)-Session Management (SM) or a Packet Data Network Gateway (P-GW) in a PDU session generation procedure of the UE.

6. The method of claim 1, further comprising encapsulating the downlink data encapsulated with the IP address or the downlink data that are not encapsulated with the IP address with the IP address of the AN.

7. The method of claim 1, wherein the encapsulated and received uplink data are uplink data in which an IP address of the network node is additionally encapsulated and received.

8. The method of claim 1,
wherein a PDU session type of the uplink data is a non-IP PDU type, and a tunneling model generated for the AN is a per-node level tunnel, and
wherein the per-node level tunnel is a common connection tunnel generated in a node unit for entire traffic between the AN and the network node.

9. The method of claim 8, wherein the network node is a User Plane Function node or a Packet Data Network Gateway (P-GW).

10. A network node that supports data transmission in a wireless communication system, the network node comprising:
a communication module configured to transmit and receive a signal; and
a processor configured to control the communication module, wherein the processor is further configured to:
receive downlink data from a Data Network (DN),
not encapsulate the received downlink data with an Internet Protocol (IP) address of a User Equipment (UE) when the DN is the IP based network, and encapsulate the received downlink data with the IP address of the UE when the DN is a non-IP based network,
transmit the downlink data encapsulated with the IP address or the downlink data that are not encapsulated with the IP address to an Access Network (AN),
receive uplink data encapsulated with the IP address of the UE from the AN,
not de-capsulate the encapsulated uplink data when the DN is the IP based network, and de-capsulate the encapsulated uplink data when the DN is the non-IP based network, and
transmit the de-capsulated uplink data or the uplink data that are not de-capsulated to the DN.

11. The network node of claim 10, wherein the encapsulated and received uplink data are uplink data in which an IP address of the network node is additionally encapsulated and received.

12. The network node of claim 10,
wherein a PDU session type of the downlink data is a non-IP PDU type, and a tunneling model generated for the AN is a per-node level tunnel, and
wherein the per-node level tunnel is a common connection tunnel generated in a node unit for entire traffic between the AN and the network node.

13. The network node of claim 12, wherein the network node is a User Plane Function node or a Packet Data Network Gateway (P-GW).

14. The network node of claim 10, wherein the received downlink data comprise the IP address of the UE, when the DN is the IP based network, and
the received downlink data do not comprise the IP address of the UE, when the DN is the non-IP based network.

15. The network node of claim 10,
wherein the IP address of the UE is an IP address of a target UE to receive the downlink data and is an IP address assigned to the UE by a Control Plane (CP)-Session Management (SM) or a Packet Data Network Gateway (P-GW) in a PDU session generation procedure of the UE.

16. The network node of claim 10, wherein the processor is further configured to additionally encapsulate the downlink data encapsulated with the IP address or the downlink data that are not encapsulated with the IP address with an IP address of the AN and transmits the downlink data to the AN.

17. The network node of claim 10,
wherein a PDU session type of the uplink data is a non-IP PDU type, and a tunneling model generated for the AN is a per-node level tunnel, and
wherein the per-node level tunnel is a common connection tunnel generated in a node unit for entire traffic between the AN and the network node.

18. The network node of claim 17, wherein the network node is a User Plane Function node or a Packet Data Network Gateway (P-GW).

* * * * *